United States Patent [19]
Voler et al.

[11] Patent Number: 4,787,196
[45] Date of Patent: * Nov. 29, 1988

[54] SELF-CLEANING ROTOR ASSEMBLY

[75] Inventors: Franja F. Voler; John K. Hale, both of New Holland; Earl E. Koch, Mohnton, all of Pa.

[73] Assignee: New Holland Inc., New Holland, Pa.

[*] Notice: The portion of the term of this patent subsequent to Mar. 31, 2004 has been disclaimed.

[21] Appl. No.: 28,945

[22] Filed: May 22, 1987

Related U.S. Application Data

[63] Continuation-in-part of Ser. No. 846,652, Mar. 31, 1986, Pat. No. 4,653,253.

[51] Int. Cl.⁴ .............................................. A01D 55/18
[52] U.S. Cl. ...................................... 56/13.6; 56/192; 56/12.8
[58] Field of Search ...................... 56/255, 192, 13.6, 6

[56] References Cited

U.S. PATENT DOCUMENTS

| | | |
|---|---|---|
| 4,166,350 | 9/1979 | Werner ................................ 56/13.6 |
| 4,238,917 | 12/1980 | Oosterling et al. . |
| 4,299,077 | 11/1981 | Wattron . |
| 4,428,181 | 1/1984 | Van Staveru et al. . |
| 4,428,185 | 1/1984 | Toillie et al. . |
| 4,499,711 | 2/1985 | McLean . |
| 4,549,390 | 10/1985 | Molean ................................. 56/13.6 |
| 4,557,104 | 12/1985 | Toillie et al. .......................... 56/13.6 |
| 4,653,253 | 3/1987 | Voler et al. ........................... 56/13.6 |

FOREIGN PATENT DOCUMENTS

| | | |
|---|---|---|
| 2839841 | 3/1980 | Fed. Rep. of Germany ....... 56/13.6 |
| 2317869 | 2/1977 | France . |

Primary Examiner—John Weiss
Attorney, Agent, or Firm—Larry W. Miller; Darrell F. Marquette; Frank A. Seemar

[57] ABSTRACT

A mechanism for removing dirt and debris from the interior of a divider member mounted on the end disc of a disc cutterbar used in a disc mower-conditioner is disclosed wherein the dividers are provided with air inlet openings to permit the introduction of air into the interior chamber of the hat-shaped divider members. Each divider member is provided with a plurality of fan blades mounted to the top plate thereof to exhaust air from within the interior chamber and create a flow of air from the air inlet openings through the interior chamber and exciting a discharge opening formed between the divider top plate and a stationary cover mounted thereabove. This flow of air cleans the interior chamber of dirt and debris. An optional filter can be utilized to reduce the amount of dirt and debris permitted to enter the interior chamber through the air inlet openings.

12 Claims, 8 Drawing Sheets

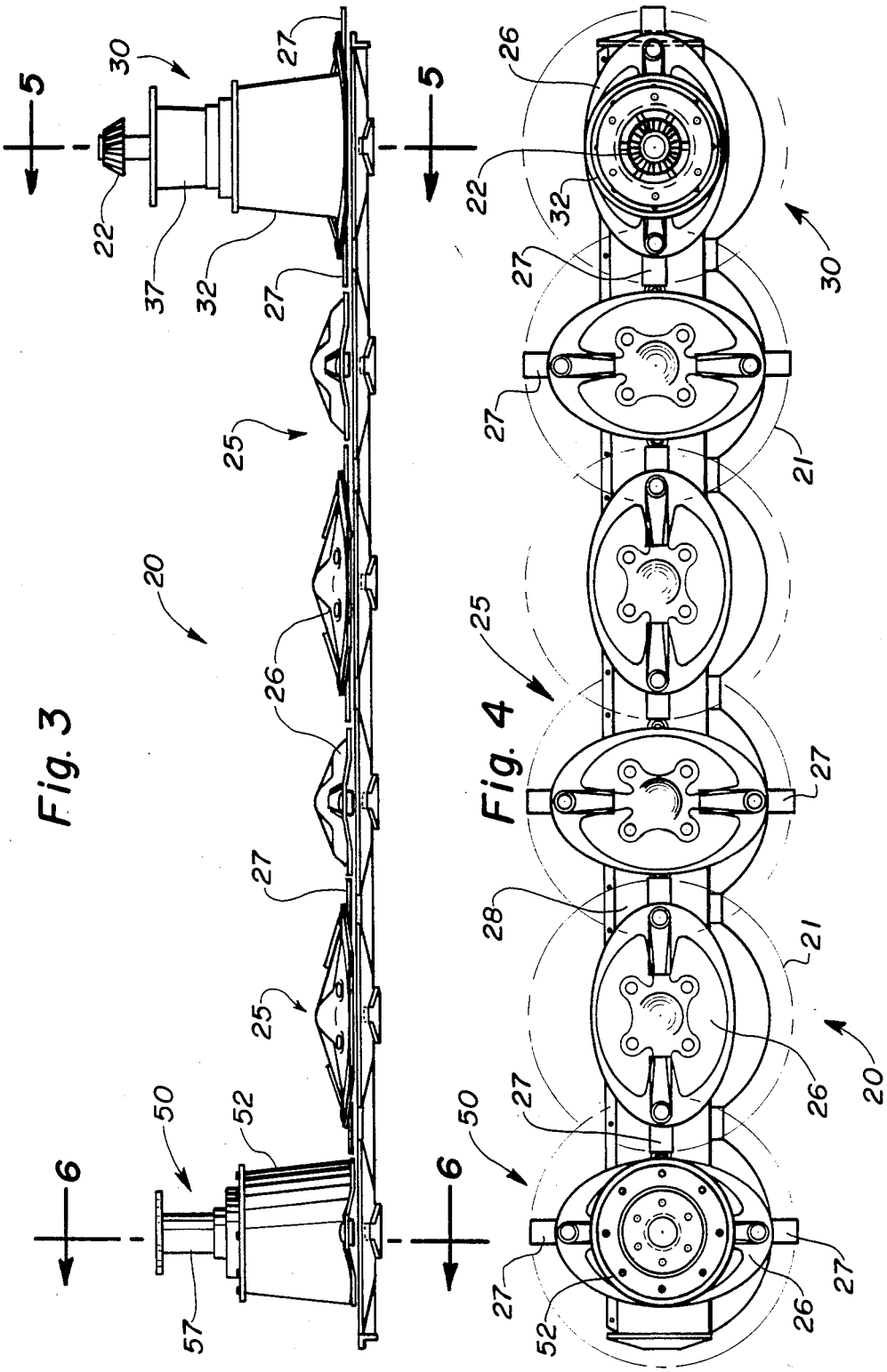

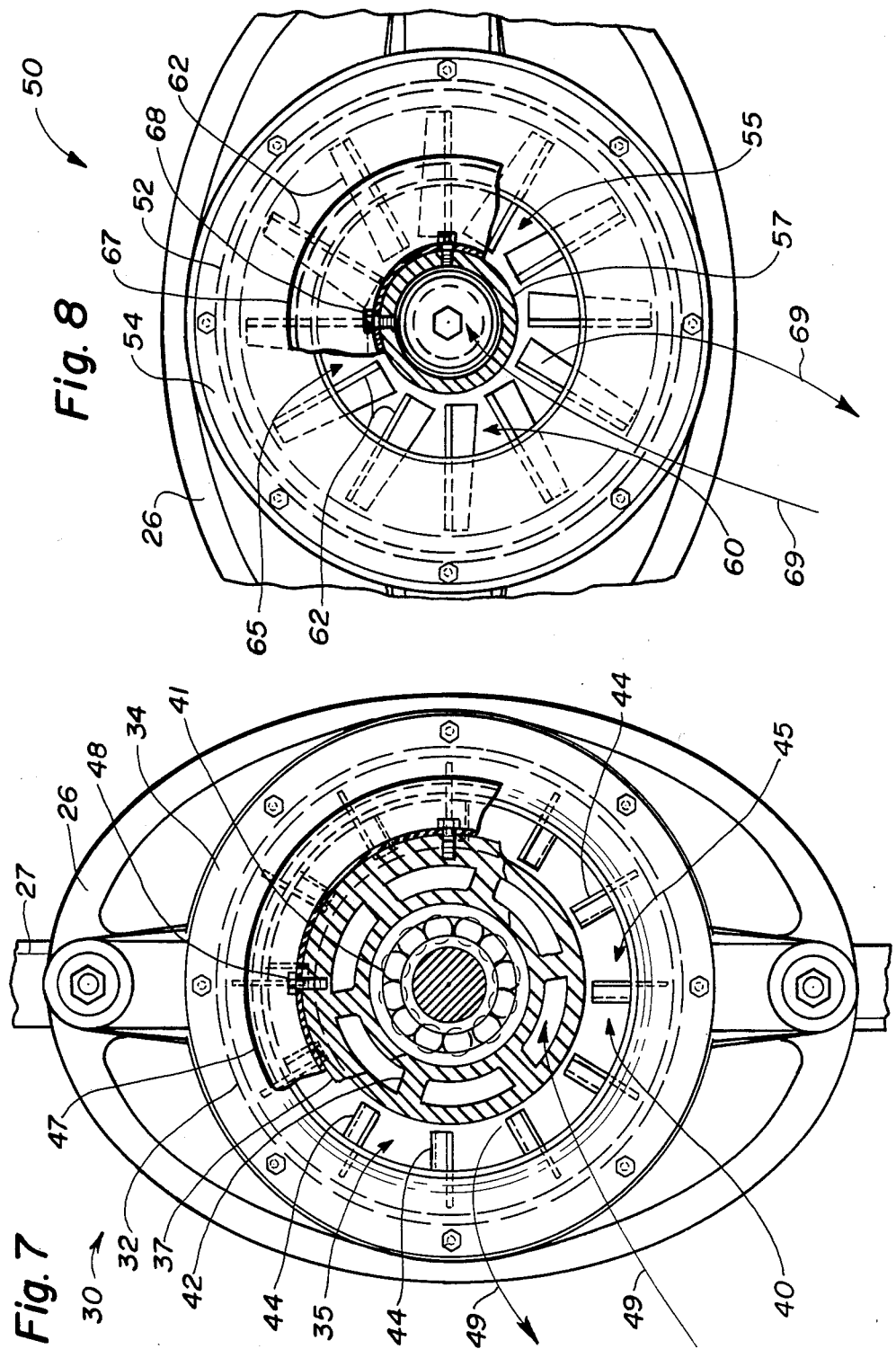

SELF-CLEANING ROTOR ASSEMBLY

CROSS REFERENCE TO RELATED APPLICATIONS

This application is a continuation-in-part of U.S. patent application Ser. No. 846,652, filed Mar. 31, 1986, and granted as U.S. Pat. No. 4,653,253 on Mar. 31, 1987.

BACKGROUND OF THE INVENTION

The present invention relates generally to disc cutterbars used for severing standing crop material by impact action and, more particularly, to an improved end rotor assembly operable to clean dirt and debris from the interior chamber thereof during operation.

Disc mower-conditioners of the type shown and described in U.S. Pat. No. 4,539,797 issued on Sept. 10, 1985, to Kenneth W. McLean, for example, utilize a disc cutterbar having a pair of opposing end disc members equipped with a hat-shaped divider member mounted thereon to facilitate the flow of crop material over the cutterbar. One embodiment of such an end disc member can be seen in U.S. Pat. No. 4,428,185, issued on Jan. 31, 1984.

It has been found that these end rotor divider members consistently fill with airborne particles of the crop material being harvested by the disc mower-conditioner. The filling of the interior chambers of the divider members by such particles creates an imbalance in the rotor, resulting in damage to interior bearing seals and occasionally resulting in the combustion of the hay particles within the interior chamber from heat due to increased friction. Various attempts to seal the divider member to prevent the introduction of debris therewithin were not found to be successful.

Accordingly, it would be desirable to provide a mechanism for cleaning debris from within the interior chamber of the divider members that would be operable during the rotating movement of the rotor.

SUMMARY OF THE INVENTION

It is an object of this invention to overcome the aforementioned disadvantages of the prior art by providing a self-cleaning rotor assembly for use as the end rotors on a disc cutterbar.

It is another object of this invention to utilize the rotational action of the divider members during operation of the disc cutterbar to create a flow of air through the interior chamber of the divider member.

It is a feature of this invention that the high rotational speed of the divider members is utilized to create a flow of air through the interior chamber of the divider members.

It is an advantage of this invention that debris is not accumulated within the interior chamber of the divider members mounted on the end rotors of a disc mower-conditioner.

It is still another object of this invention to utilize a plurality of fan blades mounted in the top plate of the divider members to exhaust air from within the interior chamber of the divider member.

It is yet another object of this invention to provide a means for the introduction of air into the interior chamber of the divider members.

It is another feature of this invention that the fan blades create a flow of air from the air inlet means through the interior chamber of the divider member and exited through a discharge opening at the top of the divider member.

It is yet another feature of this invention that the hollow support shafts for supporting the disc cutterbar from the frame of the disc mower-conditioner are utilized to permit the introduction of air into the interior chamber of the divider members below the fan blades.

It is another advantage of this invention that the introduction of air into the interior chamber of the divider members can be filtered to reduce the entrance of large particles of debris into the interior chamber.

It is still another object of this invention to provide a means of accessing the interior chamber to facilitate a cleaning of dirt and debris that may collect on the inside of the drum.

It is still another feature of this invention that a removable access door is built into the side of the divider member.

It is yet another feature of this invention that the hardware detachably affixing the access door to the body of the divider member is protected from wear by a detachable fin extending substantially the entire height of the body portion of the divider member.

It is still another advantage of this invention that the fins facilitate the feeding of severed crop material rearwardly over the cutterbar.

It is yet another advantage of this invention that the interior chamber of the divider member can be readily accessed to permit a cleaning of any dirt and debris collected therewithin.

It is a further object of this invention to provide a self-cleaning end rotor assembly having a divider member rotatably mounted thereon which is durable in construction, inexpensive of manufacture, carefree of maintenance, facile in assemblage and simple and effective in use.

These and other objects, features and advantages are accomplished according to the instant invention by providing a mechanism for removing dirt and debris from the interior of a divider member mounted on the end disc of a disc cutterbar used in a disc mower-conditioner wherein the dividers are provided with air inlet openings to permit the introduction of air into the interior chamber of the hat-shaped divider members. Each divider member is provided with a plurality of fan blades mounted to the top plate thereof to exhaust air from within the interior chamber and create a flow of air from the air inlet openings through the interior chamber and exiting a discharge opening formed between the divider top plate and a stationary cover mounted thereabove. This flow of air cleans the interior chamber of dirt and debris. An optional filter can be utilized to reduce the amount of dirt and debris permitted to enter the interior chamber through the air inlet openings.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 3 is a view of the disc cutterbar as seen along lines 3—3 of FIG. 2, with the extraneous harvester structure removed;

FIG. 4 is a top plan of the disc cutterbar seen in FIG. 3;

FIG. 7 is a cross-sectional view of the end rotor taken along lines 7—7 of FIG. 5, portions of the upper cover being removed to more clearly show the positioning and relationship of the fan blades, the hollow shaft and the power input shaft;

FIG. 8 is a cross-sectional view of the end rotor assembly taken along lines 8—8 of FIG. 6, portions of the upper cover being removed to show the positional relationships of the fan blades with the top plate of the divider member and the hollow support shaft;

DETAILED DESCRIPTION OF THE PREFERRED EMBODIMENT

Figure 1:
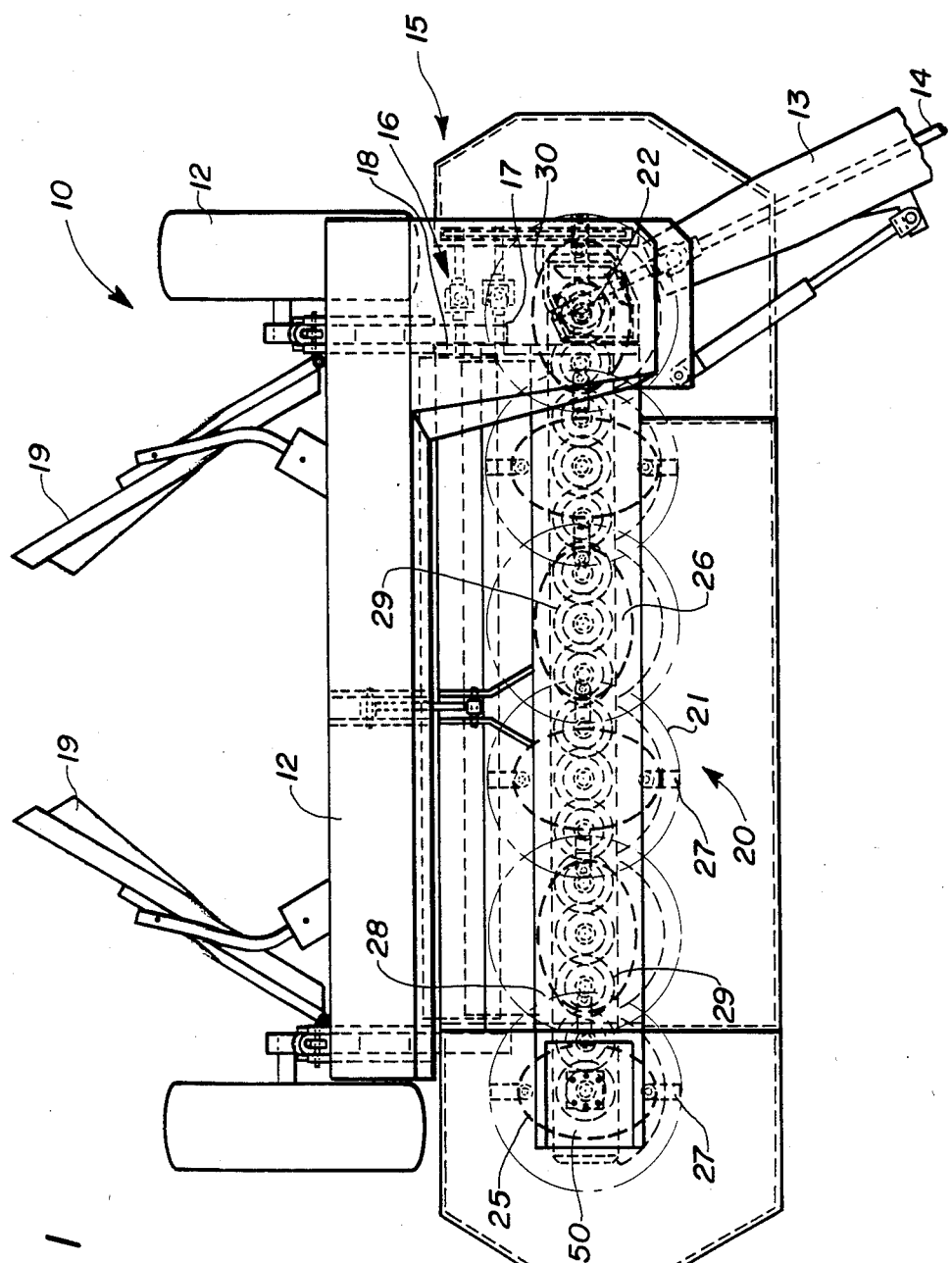
FIG. 1 is a top plan view of a disc mower-conditioner incorporating he principles of the instant invention.
Figure 2:
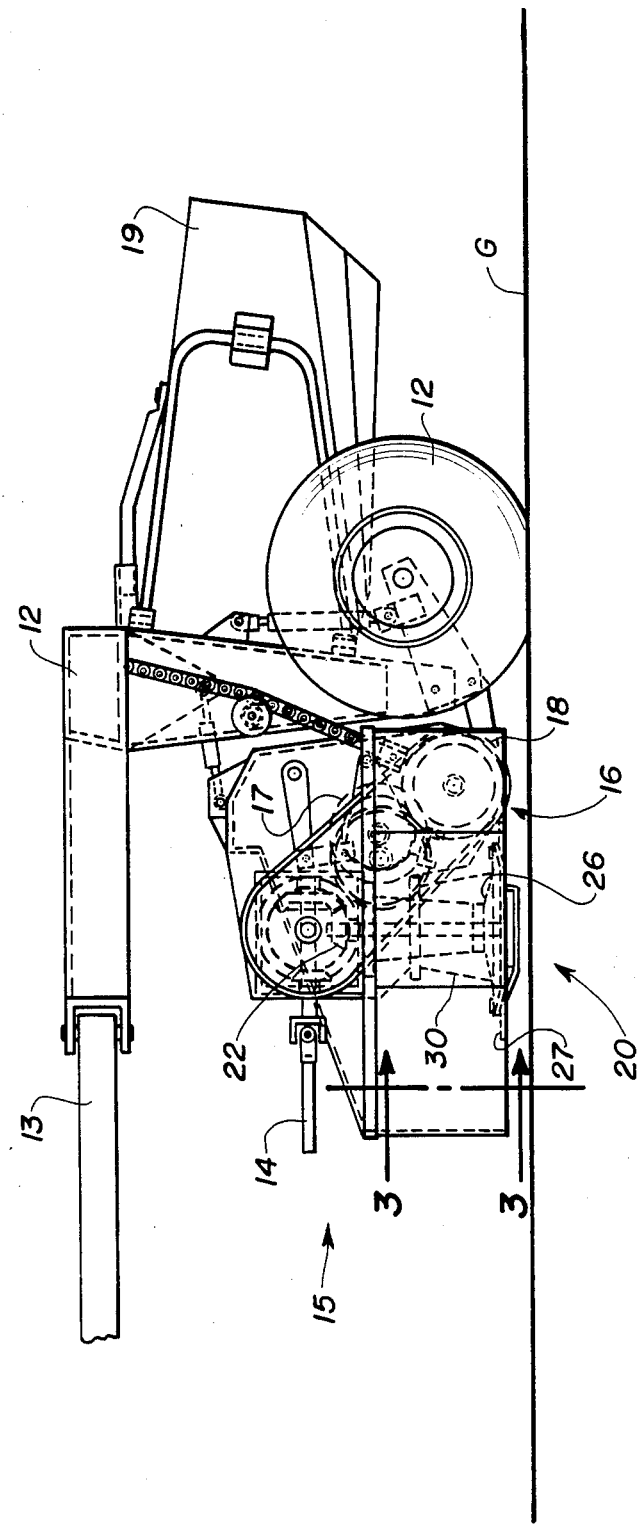
FIG. 2 is a left side elevational view of the disc mower-conditioner seen in FIG. 1.

Referring now to the drawings and, particularly, to FIG. 1, a top plan view of a crop harvesting machine, commonly referred to a disc mower-conditioner, incorporating the principles of the instant invention, can be seen. Any left and right references are used as a matter of convenience and are determined by standing at the rear of the machine, facing the forward end, the direction of travel. As best seen in FIGS. 1 and 2, the disc mower-conditioner 10 is supported over the ground G by a wheeled frame 12. The embodiment as shown in the drawings is commonly referred to as a pull-type machine and, therefore, is equipped with a draft tongue 13 and a PTO driveline 14 to input rotational power from a pulling tractor (not shown).

The machine 10 is provided with a header 15 floatingly supported from the frame 12 in a conventional manner. The header 15 is provided with a disc cutterbar 20, described in further detail below, and a conditioning mechanism 16, including an upper roll 17 and a lower roll 18, positioned immediately rearwardly of the cutterbar 20 to receive and condition severed crop. The discharge of conditioned crop material from the conditioning mechanism 16 is engaged with the rearwardly converging baffle shields 19 that deposit the conditioned crop into a consolidated windrow upon the ground G in a conventional manner.

The disc cutterbar 20 is best seen in FIGS. 3 and 4. The power input shaft 22 receives rotational power from the PTO driveline 14 and transfers the rotational power through a series of intermeshing gears 29 in a conventional manner to rotatably power the operation of the disc cutter assemblies 25, each of which has a pair of outwardly extending knives 27 that engage the standing crop material and, by rotation along a circular arc exhibited by the arc 21, affect a severing thereof from the ground. One skilled in the art will readily realize that the transmission gearing 29 within the cutterbar casing 28 is arranged in a conventional manner with a pair of idler gears disposed between each drive gear associated with the respective disc cutterbar assemblies 25 so that adjacent disc cutter assemblies rotate in opposing directions.

Figure 5:
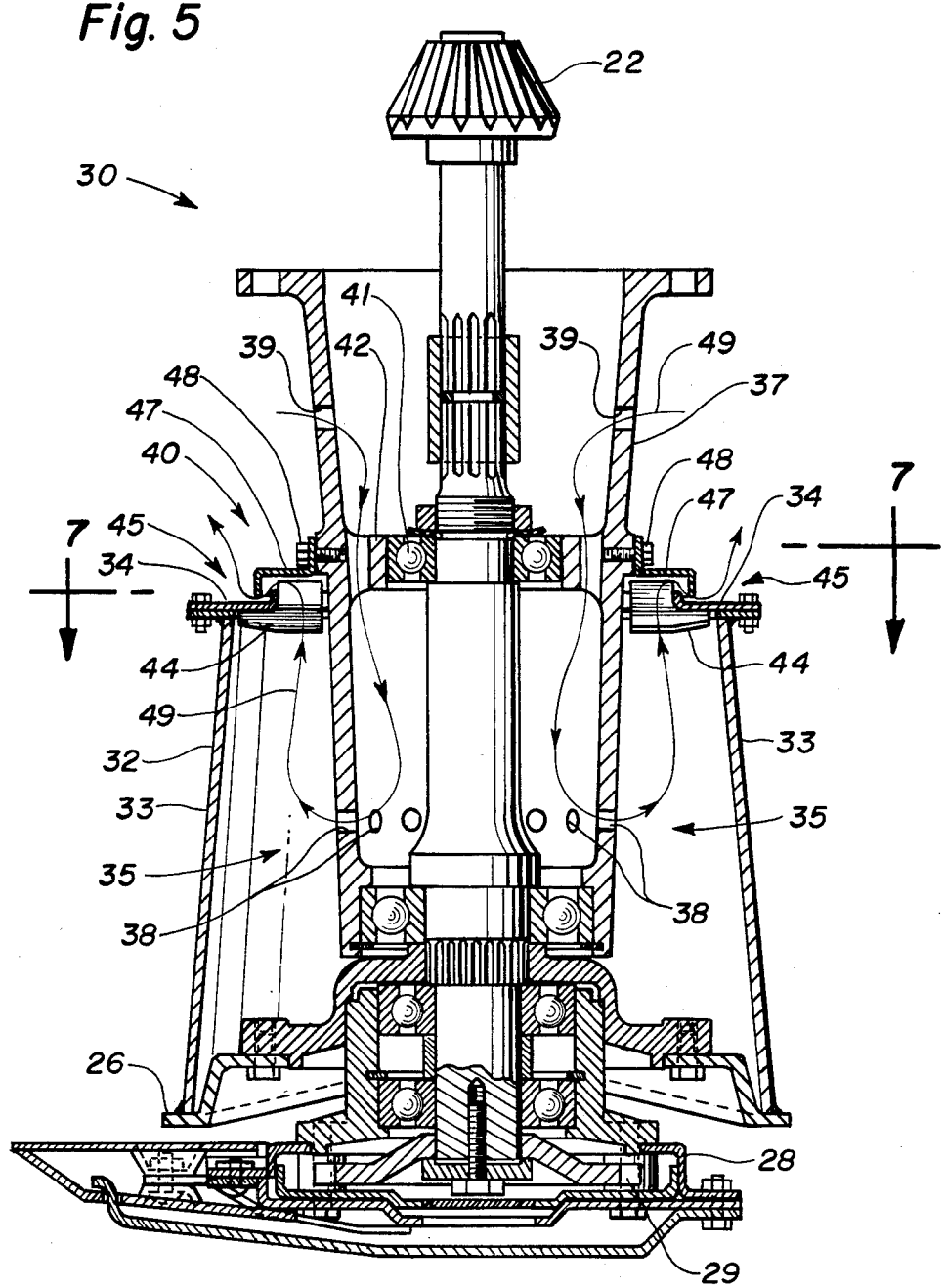
FIG. 5 is an enlarged cross-sectional view of the disc cutterbar taken along lines 5—5 of FIG. 3 to show the structural configuration of the end rotor through which rotational power is supplied to the transmission gears within the cutterbar casing.

Referring now to FIGS. 3-8, the construction and operation of the self-cleaning end rotor assemblies 30,50 can be seen. As best seen in FIGS. 3, 5 and 7, the left end rotor assembly 30 is provided with a disc member 26 carrying knives 27 to sever standing crop material and a truncated conical divider member 32 mounted on the disc member 26 to facilitate the flow of crop material over the cutterbar 20 and inwardly toward the conditioning mechanism 16. The hat-shaped divider member 32 includes a generally vertical outer wall member 33 and a top plate 34 forming the upper surface of the divider member 32 and defining an interior chamber 35 between the top plate 34 and the disc member 26.

A support shaft 37 is connected to the frame 12 of the disc mower-conditioner 10 to support the disc cutterbar 20 at a position proximate to the ground. The support shaft 37 is stationary and passes through the interior chamber 35 of the divider member 32 so that the divider member 32 is rotatable with the disc member 26 around the support shaft 37. The support shaft 37 is provided with a plurality of inlet openings 38 to permit the passage of air from within the hollow support shaft 37 into the interior chamber 35. To permit the introduction of air from the atmosphere into the hollow support shaft 37, an access opening 39 is provided in the upper portions of the support shaft 37. Because of the passage of the power input shaft 22 through the center of the hollow support shaft 37, a bearing 41 is mounted in a web-like structure 42 to retain the bearing 41 and also permit the passage of air from the access opening 39 through the hollow support shaft 37 and exiting the air inlet openings 38 into the interior chamber 35 of the divider member 32.

The top plate 34 of the divider member 32 is provided with an exhaust mechanism 40 in the form of a plurality of fan blades 44 positioned to expel air from within the interior chamber 35 through an outlet opening 45 formed as a labyrinth positioned between the top plate 34 and an upper cover 47 detachably affixed to the support shaft 37 by fasteners 48. The rotation of the divider member 32 creates a vacuum within the divider 32 by operation of the fan blades 44 to create a flow of air along the paths indicated by lines 49 to clean dirt and debris from within the interior chamber 35.

Figure 6:
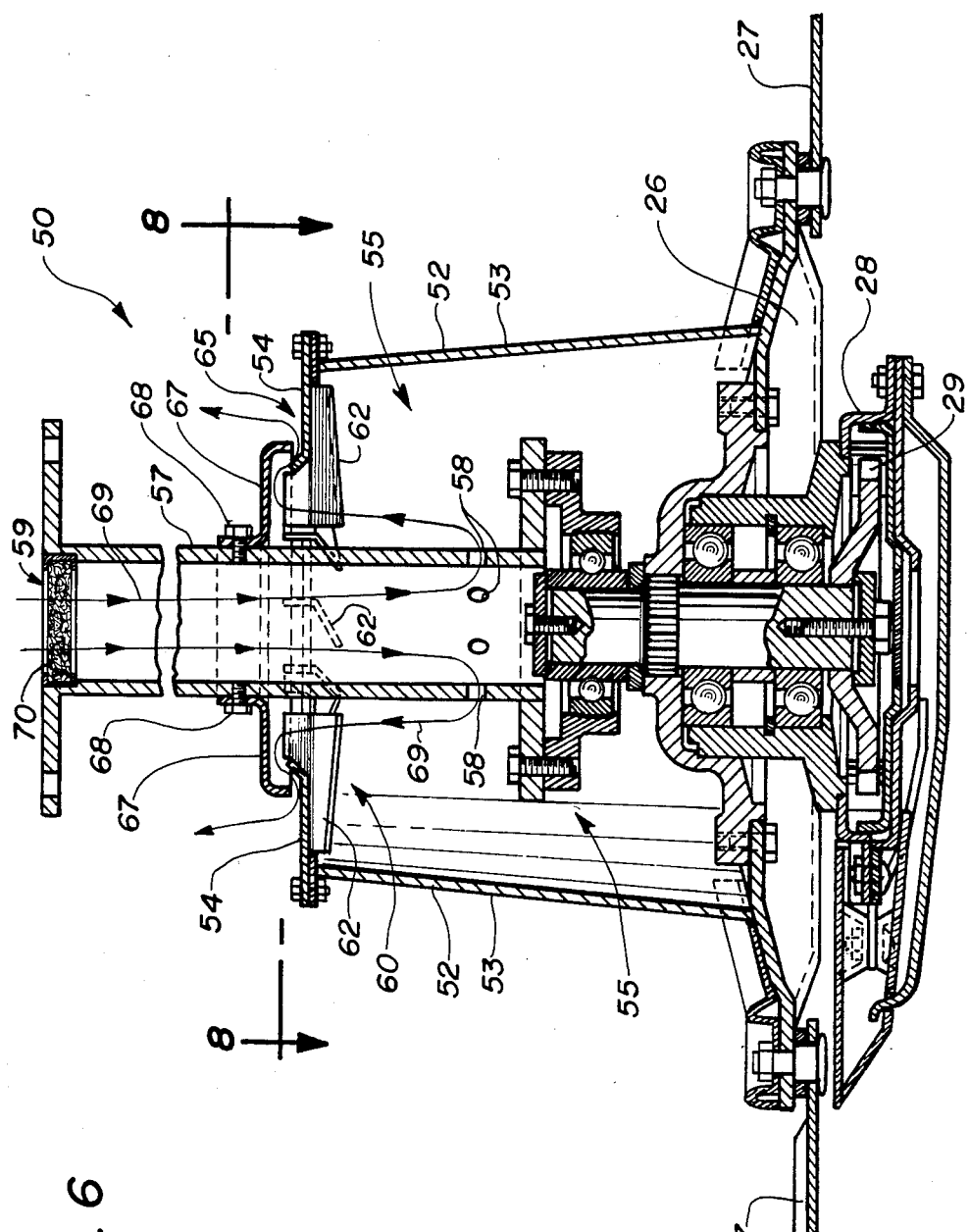
FIG. 6 is an enlarged cross-sectional view taken along lines 6—6 of FIG. 3 to show the structural details of the other end rotor cooperable with a hollow support shaft interconnecting the disc cutterbar with the mower-conditioner frame.

Referring now to FIGS. 3, 6 and 8, the structure and operation of the right end rotor assembly 50 can best be seen. Similar to the left end rotor assembly, the right end rotor assembly 50 includes a disc member 26 having knives 27 mounted thereon for severing standing crop material and a divider member 52 mounted on the disc members 26 to facilitate the flow of severed crop material over the disc cutterbar 20 and inwardly toward the conditioning mechanism 16. The divider member 52 is provided with a generally vertical, truncated conical outer wall 53 and a top plate 54 affixed to the outer wall 53 and forming the upper surface of the divider 52 and defining an interior chamber 55 therewithin.

A hollow support shaft 57 interconnects the harvester frame 12 and the disc cutterbar 20 to support the cutterbar 20 adjacent the surface of the ground. The support shaft 57 is provided with air inlet openings 58 to permit the flow of air from within the hollow support shaft 57 into the interior chamber 55 of the divider member 52. Since the support shaft 57 does not rotatably support a power input shaft, as does the left support shaft 37, the access opening 59 for the introduction of the air from the atmosphere into the hollow support shaft 57 is shown to be located at the top of the support shaft 57. One skilled in the art will readily realize that alternative access openings 59 could be satisfactorily provided.

The top plate 54 of the divider member 52 is also provided with an exhaust mechanism 60 in the form of a plurality of fan blades 62 mounted to the top plate 54. The fan blades 62 are arranged to create a vacuum within the interior chamber 55 and expel air through a discharge opening 65 formed as a labyrinth between the top plate 54 and an upper cover 67 detachably affixed by fasteners 68 to the stationary support shaft 57. As described above with respect to the left end rotor assembly 30, the rotation of the divider member 52 permits the fan blades 62 to cause a flow of air from within the hollow support shaft 57, through the air inlet openings 58 into the interior chamber 55 and to be exhausted through the outlet opening 65, as indicated by the air flow lines 69.

The operation of the disc mower-conditioner 10 to harvest standing crop material includes the rotation of the disc cutter assemblies 25 at a rotational speed in excess of 2500 revolutions per minute. Accordingly, the divider members 32,52 are rotated at this rotational speed along with the disc members 26 to which they are affixed. This high rotational speed permits the fan blades 44,62 to create a vacuum within the respective interior chambers 35,55 and thereby create a flow of air indicated by the air flow lines 49,69. This flow of air discharges any dirt and debris from within the interior chambers 35,55 during operation of the disc cutterbar 20 and effectively provides a self-cleaning end rotor assembly 30,50. Furthermore, the flow of air through the access openings 39,59 prevents the entrance of dirt and debris through these openings 39,59 and effectively provides a seal between the top plate 34,54 and the upper cover 47,67 so long as the divider members 32,52 are rotating.

The size, shape and location of the air inlet openings 38,58 and the access openings 39,59 effectively filter large particles of debris from entering the respective interior chambers 35,55. However, additional optional filtering mechanisms, such as that indicated by the filter 70 in FIG. 6, can be provided to further filter the flow of air into the interior chambers 35,55. One skilled in the art will readily realize that for the above described mechanism to operate effectively, the divider members 32,55 must be constructed so that all cracks and holes, except the air inlet openings 38,58 and access openings 39,59, are sealed to prevent the entry of material into the interior chambers 35,55.

Figure 9:
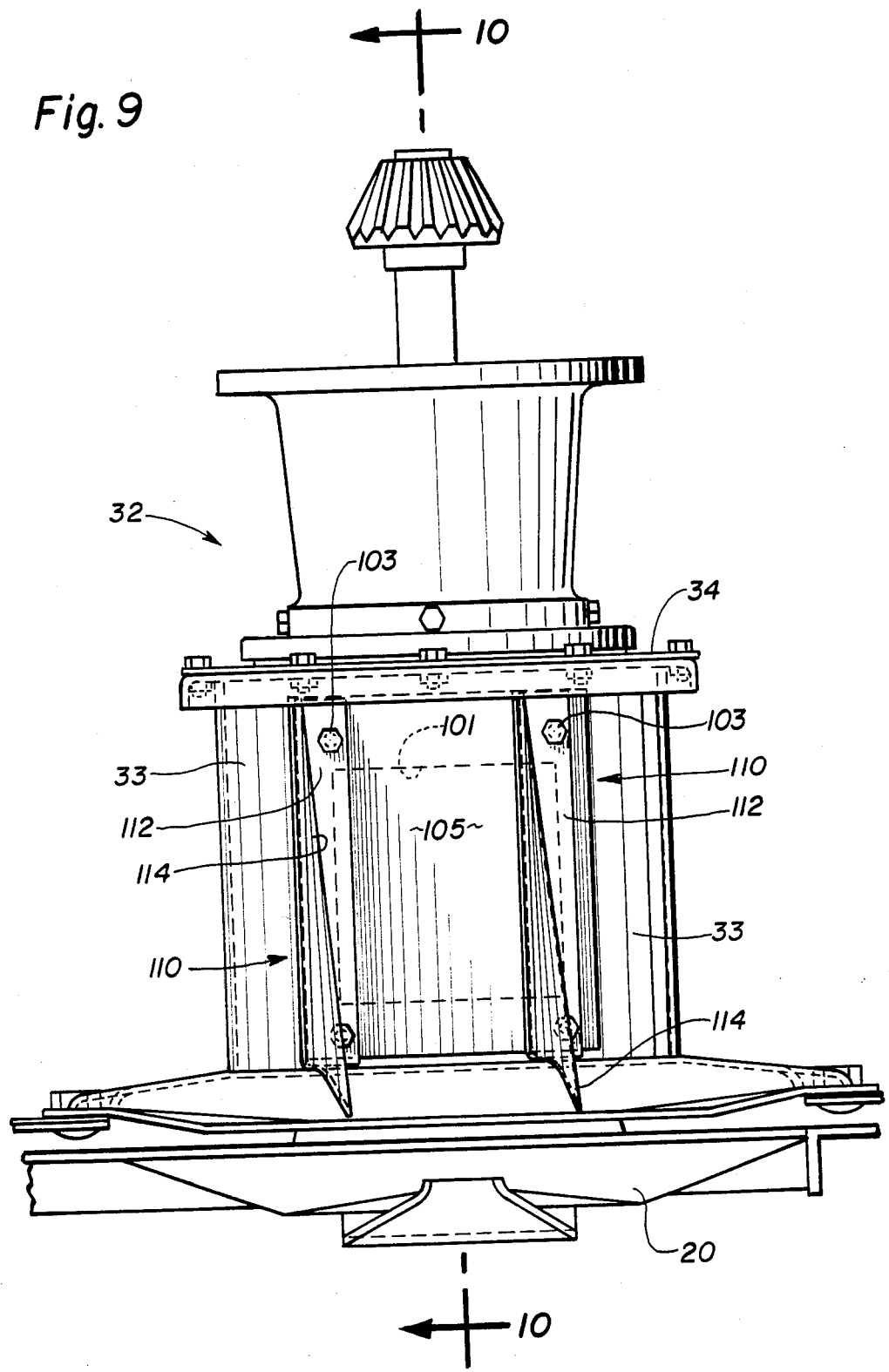
FIG. 9 is an elevational view of an alternative embodiment of the divider member at the left end of the disc cutterbar, utilizing an access door to permit access to be gained to the interior chamber of the divider member.
Figure 10:
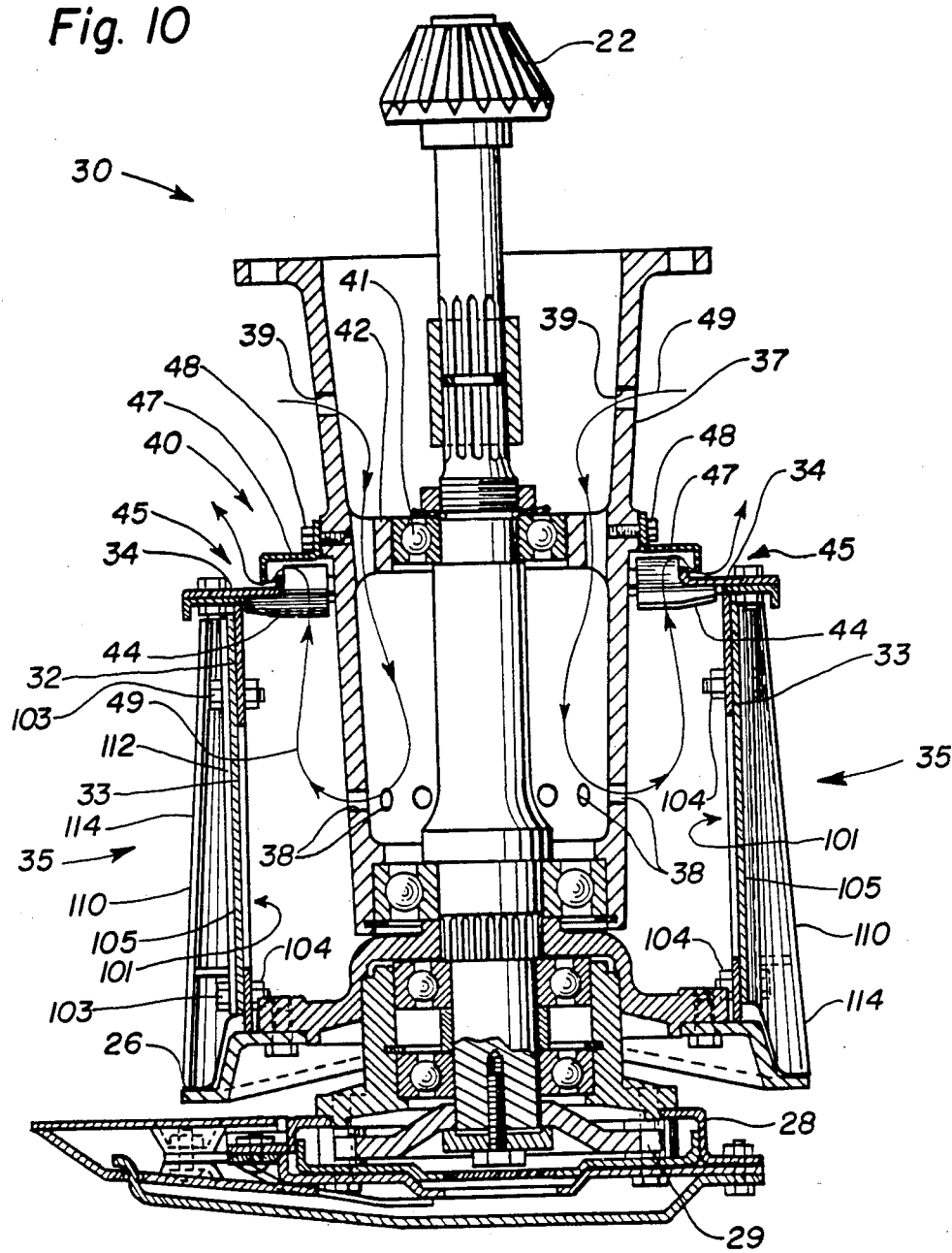
FIG. 10 is a cross-sectional view of the divider member shown in FIG. 9 and taken along lines 10—10.

Referring now to FIGS. 9 and 10, an alternative embodiment of the divider member 32 can best be seen; however, it should be noted that the structure described below would be equally applicable to the right divider member 52. The basic structure is described with respect to FIG. 5 above as indicated by the common reference numerals. The outer wall member 33 is provided with a pair of opposing door openings 101 covered by a detachable access door 105. This structure is duplicated on opposite sides of the divider member 32 to maintain rotor balance. Each access door 105 is affixed to the outer wall member by at least four fasteners 103 positioned at the respective corners of the door 105.

A fin 110 is connected to the outside of the access door 105 by each pair of vertically aligned fasteners 103. Each fin 110 is composed of a base portion 112 oriented parallel to and adjacent the outer wall member 33 and attached access door 105 and a protruding leg 114 integral with the base portion 112 but bent outwardly away from the outer wall member 33. Each fin 110 is configured such that the protruding leg 114, with respect to the direction of rotation of the divider member 32, leads the fasteners 103 to protect them from wear due to engagement with crop material. The fins 110 also improve the aggressive feeding of severed crop material over the cutterbar 20.

Although the operation of the fan blades 44 effects a cleaning of most of the debris from within the interior chamber 35 and, perhaps more importantly, effects a flow of air through the labyrinth discharge opening 45 to prevent the entrance of debris through the opening 45, it has been found that some material can enter the divider 32 and collect at the bottom of the chamber 35. A removal of the fasteners 103, which are threaded into nuts 104 fixed, such as by welding, to the inside of the divider member 32, permits the fins 110 to be removed and then the access door 105, thereby gaining access to the interior chamber 35. In this manner, any dirt or debris that may have collected within the interior chamber 35 may be removed to minimize the build-up of such material therewithin.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a disc cutterbar for severing standing crop from the ground and having a transmission casing housing power transmission means for transferring rotational power to a plurality of disc cutter assemblies from a source of rotational power, each said disc cutter assembly having at least one knife mounted thereon for engaging and severing standing crop material upon rotation thereof, said disc cutter assemblies including a pair of end discs, each of which having a generally hollow hat-shaped divider mounted thereon for rotation therewith to facilitate the flow of crop material across the disc cutterbar, each said divider having an outer wall defining an interior chamber therewithin, an improved divider comprising:

air inlet means for introducing a flow of air into said interior chamber;

exhaust means affixed to said divider to discharge air from said interior chamber upon rotation of said divider to create a flow of air from said air inlet means through said interior chamber; and a removable access door detachably connected to said outer wall to cover an opening formed therein to permit selective access to said interior chamber.

2. The disc cutterbar of claim 1 wherein said outer wall is provided with a pair of opposing openings therein covered by respective detachably connected access doors.

3. The disc cutterbar of claim 2 wherein said access doors are affixed to said outer wall by fasteners covered by a wear protection member.

4. The disc cutterbar of claim 3 wherein said wear protection member is a generally vertically oriented fin connected to the corresponding said access door by a pair of generally vertically aligned fasteners.

5. The disc cutterbar of claim 4 wherein each fin includes a base portion extending generally parallel to and adjacent said outer wall and an integral protruding leg extending outwardly from said base portion at an angle to said outer wall.

6. The disc cutterbar of claim 5 wherein said protruding leg leads said fasteners with respect to the direction of rotation of said divider.

7. In a disc mower-conditioner having a mobile frame adapted for movement over a field, a disc cutterbar supported by said frame at a forward extremity thereof adjacent the ground to sever standing crop material therefrom, said disc cutterbar including end discs having a hollow hat-shaped divider rotatably mounted thereon, said divider including a generally vertical outer wall defining an interior chamber therewithin; conditioning means supported from said frame rearwardly of said disc cutterbar to receive severed crop material therefrom and to condition said severed crop; and power means operably connected to said disc cutterbar and said conditioning means to provide operational power thereto, the improvement comprising:

a pair of access doors detachably connected to the outer wall of each said divider to cover a corresponding opening formed in said outer wall on opposing sides of said divider to permit access to said interior chamber, each said divider also being provided with a generally vertical fin detachably connected to each said access door to protect fasteners connecting the respective said door to the corresponding outer wall from wear.

8. The disc mower-conditioner of claim 7 wherein each said fin is connected to the door by a pair of generally vertically aligned fasteners, each said fin having a base portion extending generally parallel to and adjacent said outer wall and an integral protruding leg extending outwardly away from said base portion at an angle to said outer wall.

9. The disc mower-conditioner of claim 8 wherein each said protruding leg leads the corresponding fasteners with respect to the rotation of the corresponding divider.

10. The disc mower-conditioner of claim 9 wherein each said divider is provided with an inlet means to permit the introduction of air into the corresponding interior chamber.

11. The disc mower-conditioner of claim 10 wherein each said divider is also provided with a plurality of fan blades to effect a withdrawal of air from within the corresponding interior chamber and to exhaust said air through an outlet opening in each respective said divider upon rotation thereof, the operation of said fan blades effecting a flow of air from said air inlet means through the respective interior chambers.

12. The disc mower-conditioner of claim 11 wherein each said access door has a pair of said generally vertical fins detachably connected thereto.

* * * * *